(12) United States Patent
Nakayasu

(10) Patent No.: US 6,336,688 B1
(45) Date of Patent: Jan. 8, 2002

(54) HYDRAULIC BRAKE SYSTEM WITH BLEED VALVE

(75) Inventor: Yuji Nakayasu, Rochester Hills, MI (US)

(73) Assignee: Continental Teves, Inc., Auburn Hills, MI (US)

(*) Notice: Subject to any disclaimer, the term of this patent is extended or adjusted under 35 U.S.C. 154(b) by 0 days.

(21) Appl. No.: 09/579,675

(22) Filed: May 26, 2000

(51) Int. Cl.[7] ................................................. B60T 8/40
(52) U.S. Cl. ........................... 303/116.2; 303/DIG. 11; 303/900; 303/11
(58) Field of Search ................................ 303/3, 10, 11, 303/900, 901, 139, 113.1, 113.2, 87, 116.1, 116.2, 119.1, DIG. 11; 188/352

(56) References Cited

U.S. PATENT DOCUMENTS

| | | | |
|---|---|---|---|
| 5,207,487 A | * 5/1993 | Holzmann et al. | ....... 303/113.2 |
| 5,335,984 A | * 8/1994 | Alaze et al. | ............ 303/900 X |
| 5,425,575 A | * 6/1995 | Schmidt et al. | ......... 303/900 X |
| 5,445,448 A | * 8/1995 | Wolff et al. | ................. 303/900 |
| 5,649,748 A | * 7/1997 | Oehler et al. | ................. 303/87 |

\* cited by examiner

Primary Examiner—Robert J Oberieitner
Assistant Examiner—Melanie Torres
(74) Attorney, Agent, or Firm—Rader, Fishman & Grauer PLLC

(57) ABSTRACT

To provide for non-powered evacuation and filling of an anti-lock brake system with integrated control units, a check valve is placed between the suction side of the ABS pump (16) and the wheel brake (6). The check valve (26) enables evacuation and filling of the brake system without energizing electro-magnetically operated, normally closed valves at the place of vehicle assembly. With the check valve (26) in its suggested position, a release of the brake pedal after a brake operation cannot cause trapping of vacuum as previously observed in the pressure relief line as the pressure on the side of the brake line remains above atmospheric pressure and keeps the check valve closed.

3 Claims, 1 Drawing Sheet

HYDRAULIC BRAKE SYSTEM WITH BLEED VALVE

BACKGROUND OF THE INVENTION

The present invention relates to a hydraulic brake system with anti-lock control. Such brake systems include a pedal-operated pressure generator, normally a tandem master cylinder actuated by a booster-aided brake pedal. The master cylinder is connected to wheel brakes via at least one brake line which includes an electro-magnetically operated, normally open two-way, two-position valve. For pressure relief during anti-lock control operation, each of the wheel brakes is also connected to a low-pressure accumulator or reservoir via a pressure relief line. In the pressure relief line, an outlet valve is inserted which is a normally closed, electro-magnetically operated two-way, two-position valve. To return the fluid released from the wheel brakes into the brake circuit, a pump is connected with its suction side to the low-pressure accumulator or the fluid reservoir respectively, and with its pressure side through a pressure line to the brake line.

After assembling such a brake system, the entire circuitry has to be evacuated and filled with brake fluid. In order to enable a non-powered evacuation and filling of such a brake system, a check valve with a low opening pressure was placed to connect the pressure relief line to the pressure line of the pump. The check valve would open in the direction enabling a pressure flow from the relief line to the pressure line, thereby permitting the evacuation of the pressure relief line during evacuation of the pressure line. Vacuum will be kept in the pressure relief line after filling the system with brake fluid. This area will be filled with brake fluid at the end of testing the brake system during activation of the anti-lock control, thus forcing brake fluid into the pressure relief line while the normally closed valves are energized and the pump is running. While this constellation worked well for the purpose of evacuation and fill, however, it caused vacuum trapping in the return circuitry, which is the pressure relief line, after installation of the hydraulic circuitry including a valve block into a vehicle. The biggest restrictions in the brake line are the normally open electro-magnetically operated valves. When a driver releases the brake pedal, in brake systems according to the prior art, vacuum can be created between the normally open valves of the valve block and the tandem master cylinder since pressure energy between the wheel brakes and the normally open valves changes to kinetic energy at the location of the normally open valves. When this vacuum creates a sufficient pressure difference between the brake line and the pressure relief line, the bleed valve opens and traps vacuum in the pressure relief line. After a while, the vacuum will be replaced by air due to small leakage in the pressure relief line of the hydraulic circuitry, and air accumulates after a certain number of brake operations. The result is a long brake pedal stroke or a reduced braking force during electronic control of the brake operation such as anti-lock control, traction control, or driving stability control during cornering. By raising the opening pressure of the bleed valve, not as much vacuum can be trapped, however, this would result in an unsatisfactory evacuation operation.

The object of the current invention therefore is to create a brake system which enables a non-powered evacuation and filling of the circuitry on the one hand and which prevents the trapping of vacuum on the other hand.

Another object of the invention is to create a low-cost solution to the above-mentioned problem without adding excessive additional equipment.

SUMMARY OF THE INVENTION

These objectives are achieved by a brake system of the above-mentioned kind where a bypass line connects the pressure relief line with the wheel brake. This bypass line includes a bleed valve opening from the pressure relief line to the wheel brake. A possible point for connecting the bypass line including the bleed valve to the brake line is any point in direct connection with the brake line. That means if the bypass line is connected to the pressure line of the pump without any other hydraulic element in-between, that would be equivalent to connecting the bypass line directly to the brake line. This solution provides a reliable vacuum compensation during pedal releases while having a low opening pressure for the bleed valve in order to evacuate the pressure relief line properly.

DETAILED DESCRIPTION OF THE DRAWING

Figure 1:
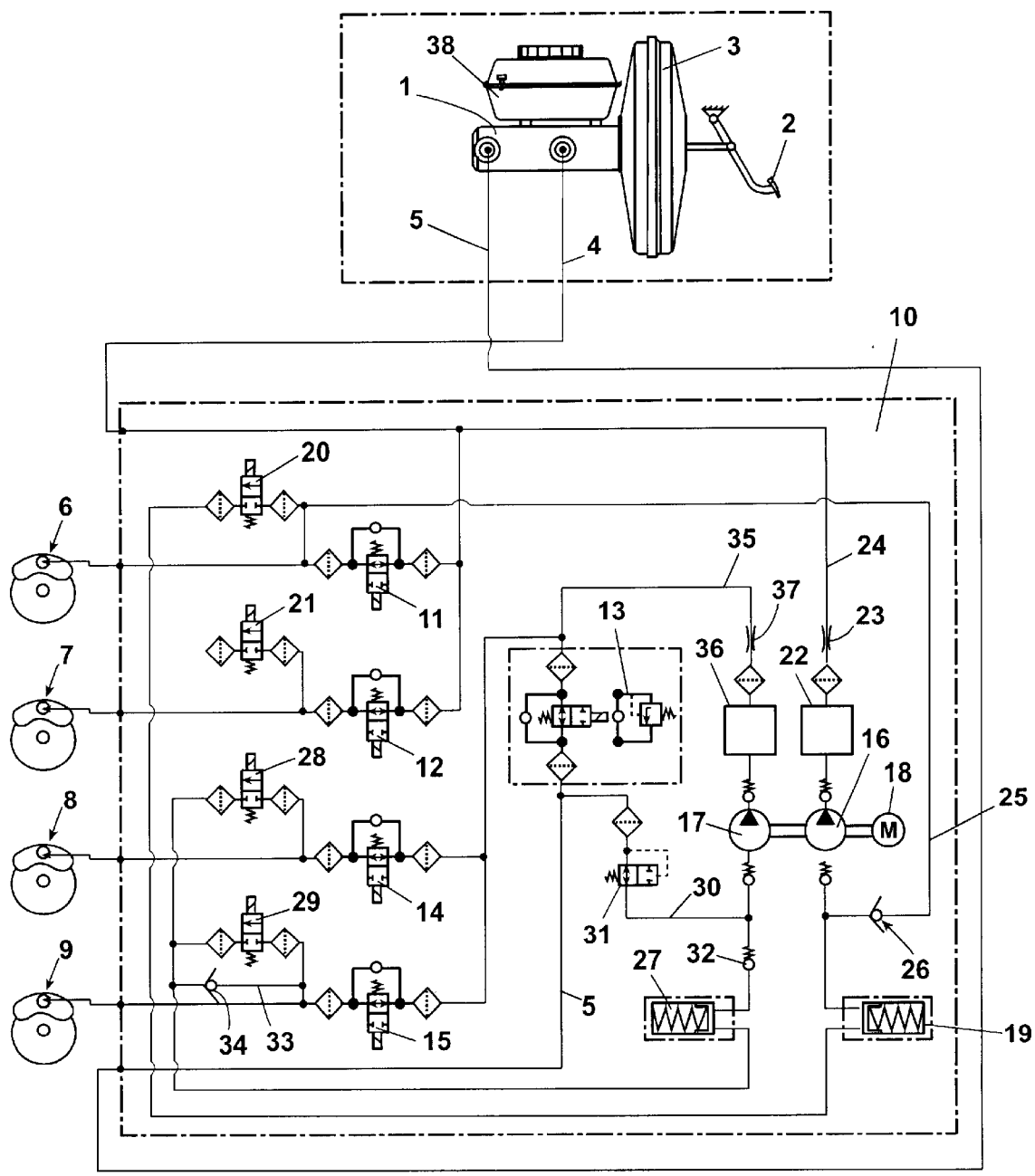
FIG. 1, the only FIGURE shows a brake system with two brake circuits, one of which includes an anti-lock control function (ABS), and the other one performs a traction control function in addition to ABS.

The brake system according to FIG. 1 includes a master cylinder 1 which is operated by a brake pedal 2, the pedal force of which is amplified by a vacuum brake booster 3. A first brake line 4 connects the master cylinder 1 through a hydraulic control unit 10 to wheel brakes 6,7, while a second brake line 5 connects the master cylinder 1 through the hydraulic control unit 10 to the wheel brakes 8,9. Brake line 4 is assigned to the so-called primary brake circuit which in this case supplies the wheels of a non-driven axle. Accordingly, this brake circuit includes an anti-lock control function but no traction control. The secondary brake circuit which connects the master cylinder to the wheel brakes 8,9 through brake line 5 is assigned to a driven axle and includes an additional traction control function. In a brake system without any traction control, both circuits would look like the primary brake circuit supplied by brake line 4 of this brake system.

Brake line 4 is connected to the wheel brake 6 through an inlet valve 11 and to the wheel brake 7 through the inlet valve 12. A separating valve 13 is inserted into brake line 5 which is connected to wheel brake 8 through inlet valve 14 and to wheel brake 9 though inlet valve 15. Inlet valves 11,12,14,15 are electro-magnetically operated, normally open valves, each having a bypass with a check valve that allows a flow of brake fluid from the wheel brake to the master cylinder. The separating valve 13 comprises a normally open, electro-magnetically operated valve which is bypassed by at least one check valve permitting fluid flow from the master cylinder to the wheel brake. In addition to that, it also has a bypass with a pressure relief valve which opens when the pressure on the wheel side of the separating valve is significantly higher than the pressure on the master cylinder side of the valve. The pressure relief valve allows pressure limitation in the brake line between the wheel brakes and the separating valve 13 during the traction control operation. For that purpose its opening pressure is at least as high as the brake pressure necessary to slow down the wheels during spinning. Each brake circuit includes a return pump 16,17 respectively. Both pumps 16,17 are driven by the same motor 18.

Pump 16 is not necessarily a self-priming pump, for it serves for ABS purposes only. Its suction side is connected to a low-pressure accumulator 19, which collect brake fluid discharge from the wheel brakes 6, 7 during a slip control operation. To this end, the wheel brakes 6, 7 are provided with outlet valves 20, 21, respectively, which are normally closed, electro-magnetically operated two-way, two-position valves. The pressure side of pump 16 is connected via a pressure line 24, including a damping chamber 22 and orifice 23 to the brake line 4 between the master cylinder 1 and the inlet valves 11, 12. A bypass line 25 including a check valve 26 connects the suction side of pump 16 to the wheel brake 6. Check valve 26 permits a fluid flow from the suction side of the pump 16 to the wheel brake 6 while shutting off the fluid flow in the other direction.

Pump 17 is a self-priming pump not only suitable for ABS, but also for traction control operations. Just like pump 16 it's suction side is connected to a low pressure accumulator 27 which collects brake fluid from wheel brakes 8, 9 that is discharged through outlet valves 28, 29 respectively. Also provided is a fluid supply line 30 including a hydraulically operated switch-over valve 31 connecting the suction side of pump 17 to brake line 5 which allows for additional fluid supply during a traction control operation. Since pump 17 is a self-priming pump, additional care has to be taken to prevent a vacuum in the low-pressure accumulator 27 and the connected wheel brakes which also would result in air accumulation in the system. To this end, a spring-biased check valve 32 is provided in the connection between the suction side of the pump and the low-pressure accumulator 27, where the pressure supply line 30 connects to the suction side of the pump between pump 17 and check valve 32. Check valve 32 is adjusted to a pressure difference of at least atmospheric pressure so that even if pump 17 were able to create a perfect vacuum, beyond check valve 32 there would still be atmospheric pressure. Also in the secondary circuit, there is a bypass line 33 with a check valve 34 connecting the suction side of the pump 17 with the wheel brake 9. In this case, the bypass line 33 basically bypasses the outlet valve 29, while the primary circuit, the bypass line 25 bypasses the outlet valve 20 and the low-pressure accumulator 19. But just like in the primary brake circuit, the check valve 34 of the secondary circuit allows the fluid flow from the suction side of the pump to the wheel brake 9. The pressure side of pump 17 is connected to brake line 5 between the separating valve 13 and the inlet valves 14, 15. Pressure line 35 of pump 17 also includes a damping chamber 36 and an orifice 37 to smooth the pressure pulses created by pump. Once the entire brake system as shown is filled with pressure fluid, an additional supply is provided by the brake fluid reservoir 38 which is mounted and connected to the master cylinder 1.

With the check valve 25 connecting the suction side of pump 16 with the wheel brake 6 and through the connection of the suction side of pump 17 with wheel brake 9, a release of the brake pedal after a brake operation cannot cause trapping of the previously observed vacuum in the pressure relief line as the pressure on the side of the brake line remains above atmospheric pressure and keeps the check valve closed.

What is claimed is:

1. A hydraulic brake system comprising:

a pedal-operated pressure generator;

a wheel brake connected to the pressure generator via a brake line;

a hydraulic pump having a suction side connected to the wheel brake via a pressure relief line, and having a pressure side connected to the brake line via a pressure line;

an electro-magnetically operated, normally open valve capable of shutting off the brake line from the wheel brake;

an electro-magnetically operated, normally closed valve capable of shutting off the wheel brake from the pressure relief line;

a bypass line connecting the wheel brake with the pressure relief line, the bypass line including a check valve preventing a flow of pressurized fluid from the wheel brake to the pressure relief line; and a low-pressure accumulator arranged in the pressure relief line in series with the wheel brake and the hydraulic pump.

2. A brake system according to claim 1, wherein the bypass line is connected to the pressure relief line between the low pressure accumulator and the pump.

3. A brake system according to claim 1, wherein the bypass line is connected to the pressure relief line between the normally closed valve and the low-pressure accumulator.

* * * * *